United States Patent [19]

Ochi et al.

[11] Patent Number: 4,541,016
[45] Date of Patent: Sep. 10, 1985

[54] SOLID STATE IMAGE PICKUP DEVICE

[75] Inventors: Shigeyuki Ochi, Machida; Seisuke Yamanaka, Mitaka, both of Japan

[73] Assignee: Sony Corporation, Tokyo, Japan

[21] Appl. No.: 454,367

[22] Filed: Dec. 29, 1982

[30] Foreign Application Priority Data

Dec. 30, 1981 [JP] Japan .................................. 56-212055

[51] Int. Cl.³ .............................................. H04N 3/15
[52] U.S. Cl. ..................................... 358/228; 358/213
[58] Field of Search ................. 358/212, 213, 44, 152, 358/228, 217, 53, 134, 221, 906, 335; 250/578, 250/204, 201 PF

[56] References Cited

U.S. PATENT DOCUMENTS

| 3,934,161 | 1/1976  | Caywood        | 307/311 |
| 4,131,919 | 12/1978 | Lloyd et al.   | 360/9   |
| 4,161,000 | 7/1979  | Cleveland      | 358/225 |
| 4,202,014 | 5/1980  | Gilligan et al.| 358/228 |
| 4,399,464 | 8/1983  | Hix et al.     | 358/213 |
| 4,420,773 | 12/1983 | Toyoda et al.  | 358/335 |
| 4,455,575 | 6/1984  | Murakoshi      | 358/213 |
| 4,456,931 | 6/1984  | Toyoda et al.  | 358/335 |
| 4,472,744 | 9/1984  | Inoue et al.   | 358/293 |

Primary Examiner—Gene Z. Rubinson
Assistant Examiner—Robert Lev
Attorney, Agent, or Firm—Hill, Van Santen, Steadman & Simpson

[57] ABSTRACT

A solid state imaging device comprising a charged coupled device CCD for use in a camera which has a shutter and wherein the output of the charged coupled device is supplied to a video processing unit which drives a magnetic recorder for recording images on a magnetic medium and wherein first and second field images are simultaneously picked up by the photosensitive regions of the solid state image sensor when the shutter is opened and the first and second field signal charges are read out sequentially from the charge couple device when the shutter is closed. The invention also provides for sweeping unrequired charges from prior images from the charge coupled device so as to prevent blooming. The exposure on the charge coupled device automatically controls the time or aperture of the exposure system based on detected signals. The shutter is closed for two field periods while the first and second fields are read out so as to prevent smearing and mixing.

14 Claims, 28 Drawing Figures

SOLID STATE IMAGE PICKUP DEVICE

BACKGROUND OF THE INVENTION

1. Field of the Invention

The present invention relates in general to solid state image pickup device and in particular to a novel solid state image camera.

2. Description of the Prior Art

Prior art conventional solid state image pickup equipment uses a solid state image sensor comprising a charge transfer device such as a CCD which are arranged in a variety of configurations for use in moving image video cameras where incident light is irridated continuously on each photosensitive region of the image sensor and the output pickup signals are read out for each field or frame period so as to perform a successive imaging operation. In solid state image sensors where the signal charges obtained in the photosensitive regions are transferred smearing or blooming can occur because of the fact that some unrequired charges leak out to the transfer section or cause thermal excitation. This is a disadvantage of prior art solid state image pickup devices. In order to eliminate this disadvantage, solid state image sensors of the prior art have had overflow drains along the transfer section or are formed into a frame transfer type. Consequently, the prior art known solid state image sensors have become extremely complicated in structure in an attempt to eliminate smearing or blooming and very expensive and highly advanced techniques have had to be used in manufacturing semiconductors which has resulted in extremely high production cost.

It has been customary previously to utilize even for still image pickup mode use such extremely expensive solid state image sensors to form a pickup unit.

Generally, image sensors for use in a video camera to produce television signals are designed so as to provide spatially deviated pictures with respect to odd and even fields in conformity with the interlaced scanning utilized in a television receiver so that the video signals representing the individual fields are alternately read out. Accordingly, in a still image pickup mode, when using an image sensor which is equipped with photosensitive regions corresponding to one frame picture elements, there is a problem of flicker when obtaining a still frame image when picking up a moving object due to fluctuations which occur in the image between each fields since the video signals of the individual fields spatially vary from each other. So as to avoid this undesired phenomena formation of a still field picture according to the prior art has lead to extreme deterioration in the vertical resolution of the video signals.

Normally, the exposure time of an image sensor in a video camera to obtain television signals is set to be equal approximately to the period of one field. However, in a still image pickup unit it is desired that the shutter be controlled so as to vary the exposure time. For example, in order to obtain a distinct still image of an object in motion it is necessary to shorten the exposure time so as to prevent blur of the image which results from the motion of the object. Since varying the exposure time causes a variation in the amount of exposure of the image sensor it becomes necessary to obtain a pickup output signal of an adequate level from the image sensor to adjust the opening of the optical path of the incoming incident light or to provide a circuit to control the level of the pickup output signal.

SUMMARY OF THE INVENTION

The present invention relates to a solid state image pickup unit which employs a solid state image sensor comprising a charge coupled device CCD and more particularly to an improved unit which is optimal for providing a still image.

The principle object of the present invention is to provide a solid state image pickup unit which is equipped with a shutter so as to vary the exposure time of a solid state image sensor under control and adapted to perform a still image pickup operation.

Yet another object of the invention is to provide a solid state image pickup unit capable of producing a still image of a satisfactory quality with a solid state image sensor of a simplified structure.

Yet another object of the invention is to provide a solid state image pickup unit which is suited to produce a still image of excellent quality and which prevents deterioration of the image quality which results from smearing or blooming.

Yet a further object of the invention is to provide a solid state image pickup unit which is capable of forming a still image without causing flickering which is an undesired phenomena.

Yet another object of the invention is to provide a solid state image pickup unit capable of automatically controlling the aperture stop and the shutter speed positively to obtain a pickup output signal of a satisfactory quality and at a proper signal level from a solid state image sensor.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 4B illustrates how signal charges are transferred during a signal read period, FIG. 4C illustrates how signal charges are transferred during a charge sweep period, FIG. 4D illustrates how the first field signal charges are transferred in a still frame image pickup mode and FIG. 4E illustrates how the second field signal charges are transferred in a still frame image pickup mode;

DESCRIPTION OF THE PREFERRED EMBODIMENTS

Figure 1:
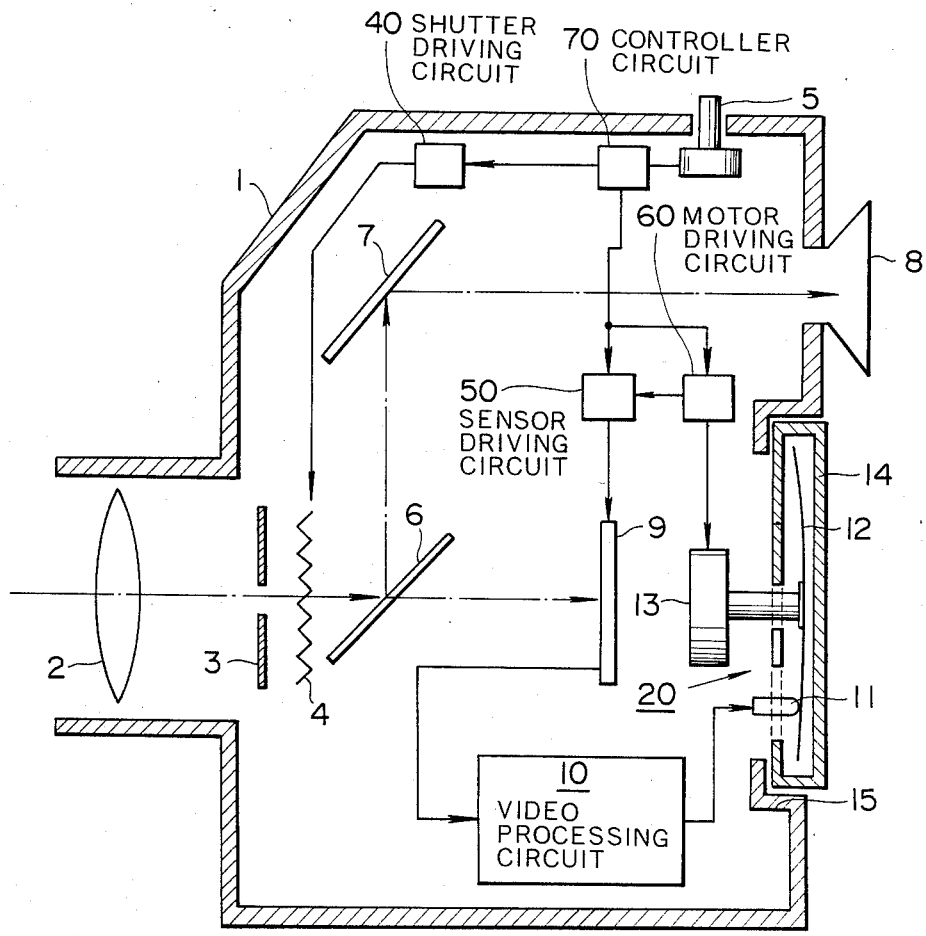
FIG. 1 schematically illustrates a camera with a solid state image sensor according to the invention.

The invention relates to a solid state image pickup unit of the type that utilizes a solid stage image sensor comprising a charge coupled device (CCD) and similar devices and more particularly to an improved unit for optimally providing a still image.

A variety of configurations have been known for conventional solid state image pickup units equipped with a solid state image sensor comprising charge transfer elements such as CCD and such configurations have been known for use in moving image video cameras where incident light is continuously irridated on each photosensitive region of the image sensor and the pickup output signals are read out of the device during each field or frame period so as to perform successive imaging operation. In the solid state image sensor where the signal charges obtained in the photosensitive regions are transferred a disadvantage exists due to the undesired phenomena known as smearing or blooming which are caused from the fact that some unrequired charges leak out to the transfer section or cause thermal excitation. So as to eliminate this disadvantage, the solid state image sensors have been previously arranged so as to provide an overflow drain along the transfer section or are formed into a frame transfer type. Consequently, it has been unavoidable to prevent prior art solid state image sensors from becoming extremely complicated in structure because of the necessity of eliminating the smearing or blooming. Also, highly advanced techniques for manufacturing of the semiconductors has resulted and extremely high production costs have resulted for these prior art devices.

It has been customary previously to employ even for a still image pickup operation mode an extremely expensive solid state image sensor as the pickup unit.

Generally, the image sensor for use in a video camera to produce television signals is designed so as to provide spatially deviated pictures with respect to the odd and even fields in accordance with the interlaced scanning executed in a television receiver so that the video signals representing the individual fields are alternately read out. Accordingly, in a still image pickup mode effected by the image sensor which is equipped with photosensitive regions corresponding to one frame picture element the problem of flicker arises when obtaining a still frame image by picking up a moving object. Such fluctuations occur in the image at each field since the video signals of the individual fields deviates spatially from each other.

In the prior art, extreme deterioration in the vertical resolution of video signals has occurred in the formation of merely still field pictures because of the above listed undesired phenomena.

Normally, the exposure time of an image sensor in a video camera for obtaining television signals is set to be approximately equal to the period of one field. However, in a still image pickup unit, it is desired that the shutter be provided and controlled so as to vary the exposure time. For example, in order to obtain a distinct still image of an object in motion particularly rapid motion, it is necessary to shorten exposure time so as to prevent blurring of the image that may result from the motion. Since varying the exposure time causes a variation in the amount of exposure of the image sensor it becomes necessary for obtaining a pickup output signal of an adequate level from the image sensor to adjust the opening of the optical path of incident light or to provide a circuit to control the level of the pickup output signal.

A principle object of the invention is to provide a solid state image pickup unit which is equipped with a shutter so as to vary the exposure time of a solid state image sensor under control and adapted to perform a still image pickup operation.

FIG. 1 illustrates an electronic still camera in which the present invention is installed wherein a still image is produced by a solid stage image sensor 9 and the image information obtained from the image sensor is recorded on a rotary magnetic disc 12.

The camera housing 1 includes a lens system 2 through which collected light passes and then to an iris diaphragm mechanism 3. A shutter 4 is mounted in the light path and when the shutter is opened the light energy passes through a half-silvered mirror 6 which allows part of the light energy to pass therethrough to impinge upon the solid state image sensor 9 and also reflects part of the energy upwardly to a second mirror 7 and to a view finder 8. The output of the solid state image sensor 9 is supplied to the magnetic recorder 20 and in this camera the image is recorded on the magnetic disc 12 rather than on a chemical optical film as in the prior art and the image is converted into electrical signals and recorded on the magnetic disc 12.

The magnetic recorder 20 can be loaded with a rotary magnetic disc 12 as the magnetic recording medium and a cover or a jacket 14 in which the disc 12 is mounted can be loaded into the camera housing 1 and also can be removed from the camera housing 1 so as to reproduce the images on the magnetic disc 12. The disc 12 is rotatably driven at a predetermined speed by a drive motor 13 which is mounted in the camera housing 1 and the images are magnetically recorded on the magnetic disc 12 by a magnetic head 11. The head 11 receives through a signal processing circuit 10 the image information which is converted to electrical signals by the solid state image sensor 9.

A shutter actuating button 5 actuates a controller circuit 70 which supplies an output to the shutter driving circuit 40 which controls the shutter 4. When the shutter button 5 is depressed for shooting a picture as is described later action of the shutter 4 will occur after the rotation phase and speed of the magnetic disc 12 has occurred so that a recording operation can be performed by the recorder 20 synchronously with the image pickup of the solid state image sensor 9. The image information representing one still picture is recorded in one of the tracks formed concentrically with each other on the rotary magnetic disc 12 in the recorder 20. When the image information thus recorded on the magnetic disc 12 is reproduced by a playback means not shown, a still picture is displayed on the screen of an ordinary television receiver. It is to be realized that the cartridge 14 which contains the magnetic disc 12 can be removed from the camera 1 and placed in the playback means.

In the invention, the shutter mechanism 4 normally is kept open and when the shutter actuating button 5 is depressed, a shutter actuating signal $S_S$ is supplied by the controller circuit 70 to the shutter driving circuit 40 at a time $t_s$ so that the circuit 40 closes the shutter mechanism in response to the signal $S_S$ after the lapse of a predetermined exposure time $T_S$ from the time point $t_0$ of a vertical sync signal $V_{sync}$.

The solid state image sensor 9 is irridated with the incident light of the image through the optical path including the shutter mechanism 4 and performs an image pickup operation synchronously with the vertical sync signal $V_{sync}$. Immediately before the signal charges obtained by irridation of the incident light are read out to obtain the video signals, any unnecessary and unrequired charges remaining in the signal shift section are swept away by transferring them from the vertical shift registers 93 to the charge absorber 99, and then the signal is read out during a light shielded condition with the shutter mechanism closed. The actions of the shutter mechanism 4 and the solid state image sensor 9 are shown in the time charts FIGS. 2A through 2E.

Figure 3:
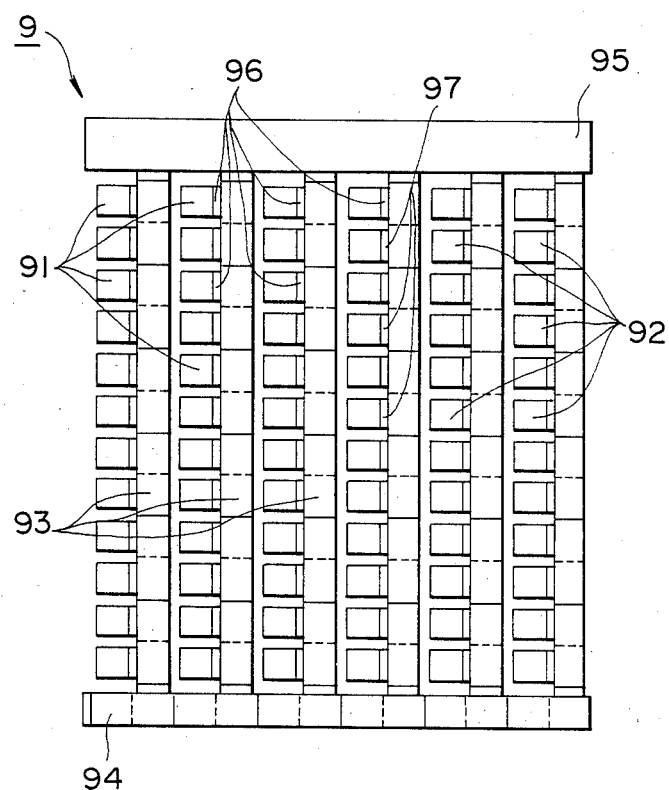
FIG. 3 is a plan view of the solid state image sensor used in the embodiment of FIG. 1.

The solid state image sensor 9 utilized in this exemplary embodiment consists of an interline transfer charge coupled device CCD image sensor formed as shown in FIG. 3. Photosensitive regions 91 correspond, respectively, to the picture elements of a first field as, for example, the odd field and are arranged in a matrix of rows and columns as shown. Second photosensitive elements 92 corresponding to the picture elements of a second field are also arrayed in a matrix and are alternately spaced with the elements 91. Vertical shift registers 93 are interspaced adjacent the regions 91 and 92 as shown for removing the electrical signals in a vertical direction from the elements 92 and 93. The vertical shift registers 93 supply a horizontal shift register 94 located at the bottom of FIG. 3 to allow the optical electrical signals to be removed. A charge absorbing section 95 is connected to the ends of the vertical shift registers 93 opposite the horizontal shift register 94. Transfer gates 96 and 97 are respectively provided between the photosensitive regions 91 and 92 and the vertical shift registers 93. Each of the shift registers 93 is formed to be bidirectional so that they can shift the signal toward the horizontal shift register 94 located at one end thereof or during another function shift the signal toward the charge absorbing section 95 located at the other end of the shift registers 91.

In the solid state image sensor 9 with the above structure, the transfer gates 96 and 97 are opened during a gate open period $T_W$ which is synchronized with the vertical sync signal $V_{sync}$ and the signal charges stored in the photosensitive regions 91 and 92 are transferred during a charge storage period $T_C$ in an amount proportional to the incident light to the vertical shift registers 93 through the transfer gates 96 and 97 respectively. The signal charges transferred to the vertical shift registers 93 are shifted vertically to the horizontal shift register 94 during a signal reading period $T_R$ according to vertical shift clock pulses which are synchronized with a horizontal sync signal in a manner such that the component of one horizontal line is shifted during on horizontal scanning interval 1H and then the signal charges which have thus been shifted are read out sequentially from the horizontal shift register 94. The vertical shift registers 93 are driven by fast-shift clock pulses during a charge sweep period $T_L$ which occurs between the signal read period $T_R$ and the gate open period $T_W$ so that any unrequired charges remaining in the vertical shift registers 93 are swept away to the charge absorbing section 95.

Reading out the signal from the solid state image sensor 9 is performed in relation to the action of the shutter 4.

Figure 2:
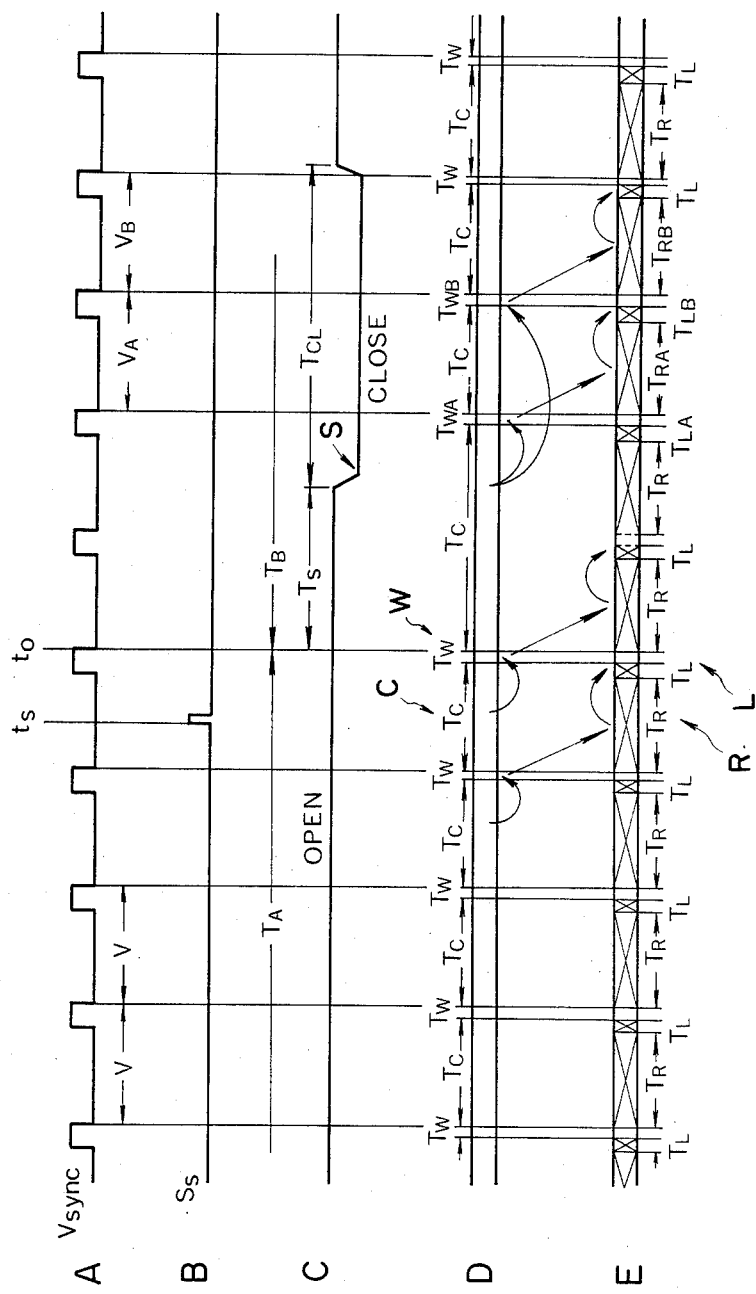
FIGS. 2A through 2E comprise time charts for explaining the operation of the invention.

As illustrated in the time charts of FIGS. 2A through 2E, a shutter actuating signal $S_S$ illustrated in FIG. 2B is generated at a time $t_s$ when the shutter button 5 is depressed. When the shutter mechanism 4 is closed as illustrated in FIG. 2C after the elapse of an exposure period $T_S$ from the time $t_0$ from the trailing edge of the first vertical sync signal $V_{sync}$ illustrated in FIG. 2A after the signal $S_S$ reading out occurs from the solid state image sensor 9 which is switched at the time $t_0$ as follows.

Figure 4A:
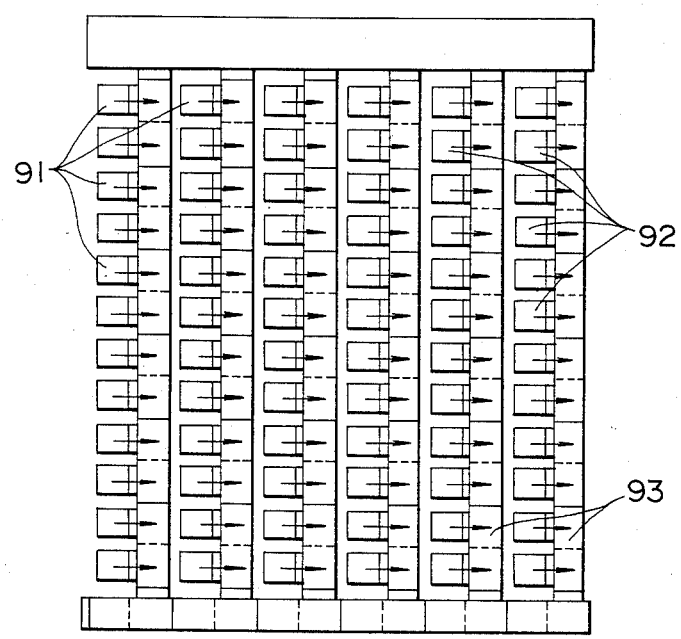
FIGS. 4A through 4E comprise plan views of the solid state image sensor and illustrate how the various signals are transferred with FIG. 4A illustrating how signal charges are transferred during a normal open gate period.
Figure 4B:
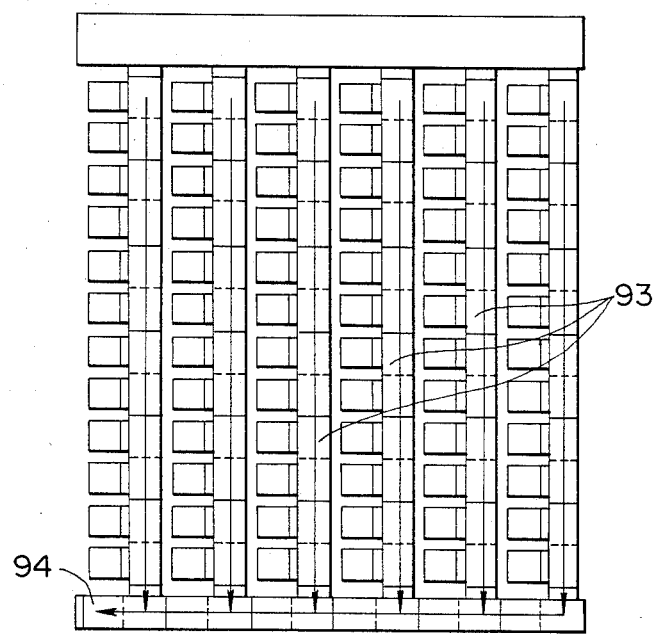
Figure 4C:
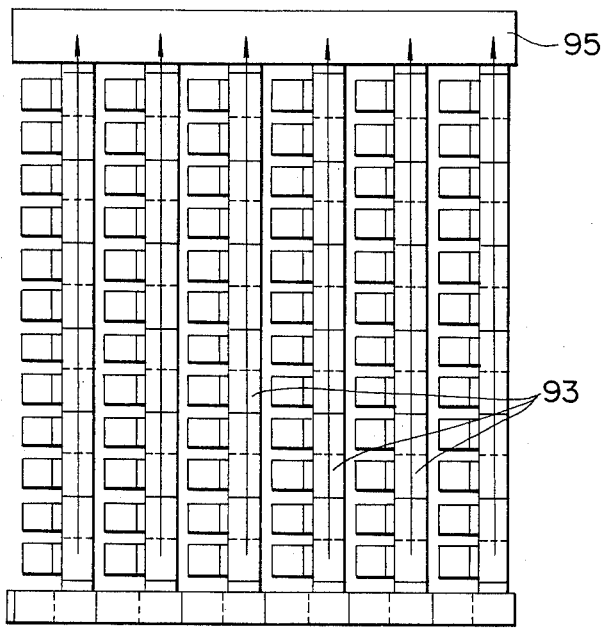

First, during the period $T_A$ prior to the time $t_0$ all of the transfer gates 96 and 97 are opened during the gate open period $T_L$ and the first and second field charges obtained in the photosensitive regions 91 and 92 during the charge storage period $T_C$ are simultaneously transferred to the vertical shift registers 93 as illustrated in FIG. 4A. The signal charges of the individual fields are integrated and read out through the horizontal shift register 94 as shown in FIG. 4B during the signal read out period $T_R$ indicated by R in FIG. 2E. After the reading out of the signal charges has been completed, a charge sweep period $T_L$ occurs indicated by a L in FIG. 2E during which any unrequired charges remaining in the vertical shift registers 93 are transferred upwardly relative to FIG. 3 to the charge absorbing section 95 as shown in FIG. 4C and such charges are thus removed. Immediately after the unrequired charges have been swept from the vertical shift registers 93 during the charge sweep period $T_L$ the gate open period $T_W$ illustrated as W in FIG. 2D occurs during which the transfer gates 96 and 97 are again opened so that the signal charges stored during the period $T_C$ indicated as C in FIG. 2D will be transferred from the photosensitive regions 91 and 92 to the vertical shift registers 93. Operation during the gate open period $T_L$, the signal read period $T_R$ and the charge sweep period $T_L$ are synchronously performed with the vertical sync signal $V_{sync}$.

Figure 4D:
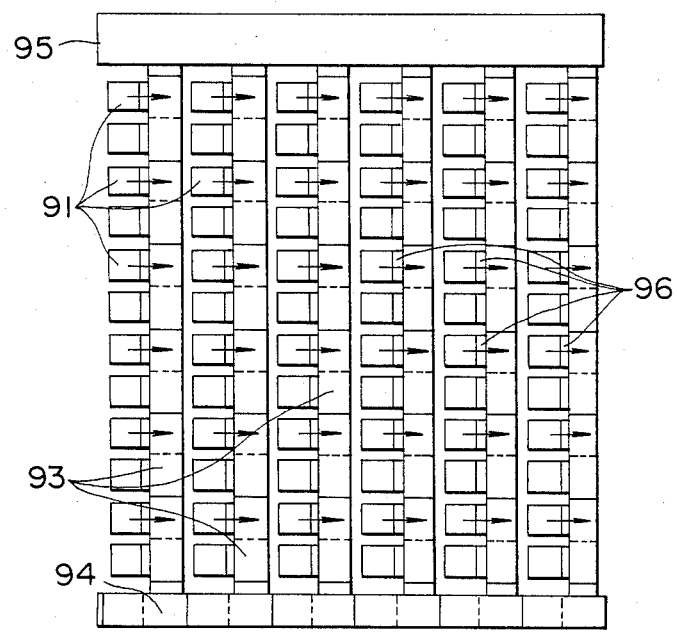
Figure 4E:
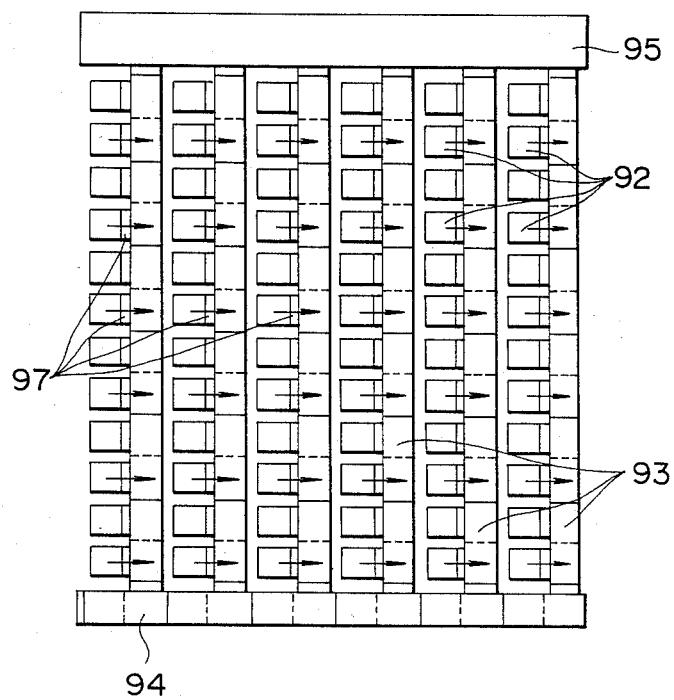

In the event the exposure period $T_S$ prior to closing of the shutter mechanism 4 extends over a plurality of fields in this example two fields during the period $T_B$ after the time $t_0$, the transfer gates 96 and 97 are not permitted to open during the exposure period $T_S$ so that the photosensitive regions 91 and 92 will remain in a charge storage state during the period of such plural fields including the exposure period $T_S$. The shutter mechanism 4 will be closed at a time S illustrated in FIG. 2C after the elapse of the predetermined exposure period $T_S$ from the time $t_0$. During the period $T_{CL}$ during which the shutter mechanism remains closed, the signal charges stored in the photosensitive regions 91 and 92 during the exposure period $T_S$ are individually read out according to the respective fields. That is, during the first vertical scanning period $V_A$ included in the shutter closed period $T_{CL}$, the transfer gates 96 for the first field photosensitive regions 91 will be opened during the gate opened period $T_{WA}$ so that the first field signal charges will be transferred to first the vertical shift registers 93 and then to the horizontal shift registers 94 as illustrated in FIG. 4D and will then be read out during the signal read period $T_{RA}$. During the next vertical scanning period $V_B$, the transfer gates 97 for the second field photosensitive regions 92 will be opened during the gate open period $T_{WB}$ so that the second field signal charges are transferred to the vertical shift registers 93 as illustrated in FIG. 4E and then will be read out during the signal read period $T_{RB}$. Any unnecessary charges are swept away to the charge absorbing section 95 during the charge sweep periods $T_{LA}$ and $T_{LB}$ which occur immediately prior to the gate open periods $T_{WA}$ and $T_{WB}$, respectively. The flow of the charges as described above which are stored during the period $T_C$ are indicated by arrows in FIGS. 2D and 2E.

Thus, the signal charges stored in the photosensitive regions 91 and 92 during the exposure period $T_S$ represent the image information for both the first and second fields respectively without any spatial deviation so that even in the case the object to be shot is in motion, the video signal of a still frame image can be obtained which is free from flickering and other disturbances.

It is also possible to control the length of the effective exposure time by adjusting the potentials of the transfer gates 96 and 97 during the exposure period $T_S$. Furthermore, since the signal charges are caused to flow out when the shutter mechanism is closed, no external light will be projected onto the CCD sensor during the signal read out period which eliminates the occurrence of sxearing. Additionally, due to the sweeping of unrequired charges away to the charge absorbing section 95 immediately before transferring the signal charges to the shift registers 93, it will be possible to avoid undesired phenomena such as blooming which are caused by the residual charges that are mixed with the signal charges that are to be next read out.

Further, because of the normally opened shutter 4 employed in the above described embodiment automatically setting of the shutter speed and the aperture stop can be accomplished as well as automatic adjustment of the video signal level by detecting the amplitude of the signal charges read out from the solid state image sensor 9 prior to the execution of a still image pickup operation in response to pushing of the shutter actuating button 5.

Figure 5:
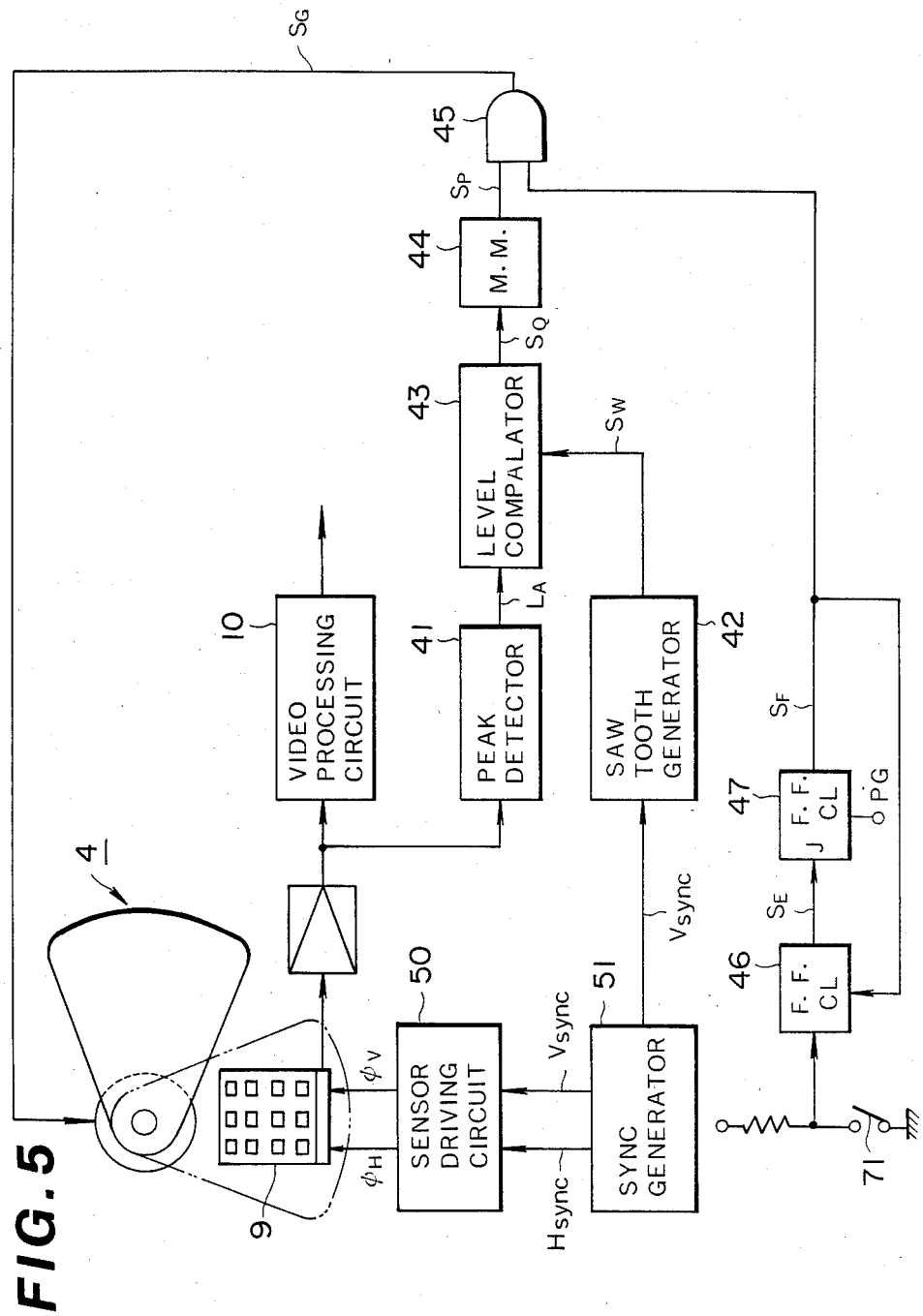
FIG. 5 is a schematic block diagram illustrating the circuit configuration for an aperture stop preset type of automatic control system in the invention.

FIG. 5 illustrates an example of an automatic control system of an aperture stop preset type. In this embodiment, the solid state image sensor 9 performs the above described pickup while being driven according to shift clock pulses $\emptyset_H$ and $\emptyset_V$ formed by driver circuit 50 in synchronizm with a vertical sync signal $V_{sync}$ and a horizontal sync signal $H_{sync}$ generated by a sync generator 51. The video signal read out from the image sensor 9 is fed to both the processing circuit 10 and a mean value detector circuit 41 which produces an output by detecting the mean DC level $L_A$ of the video signal obtained by the image sensor 9 and feeds the detected output to a level comparator 43. In the output of the detector circuit 41, the DC level is lowered or raised depending on whether the object image being picked by the solid state image sensor is bright or dark.

Figure 6:
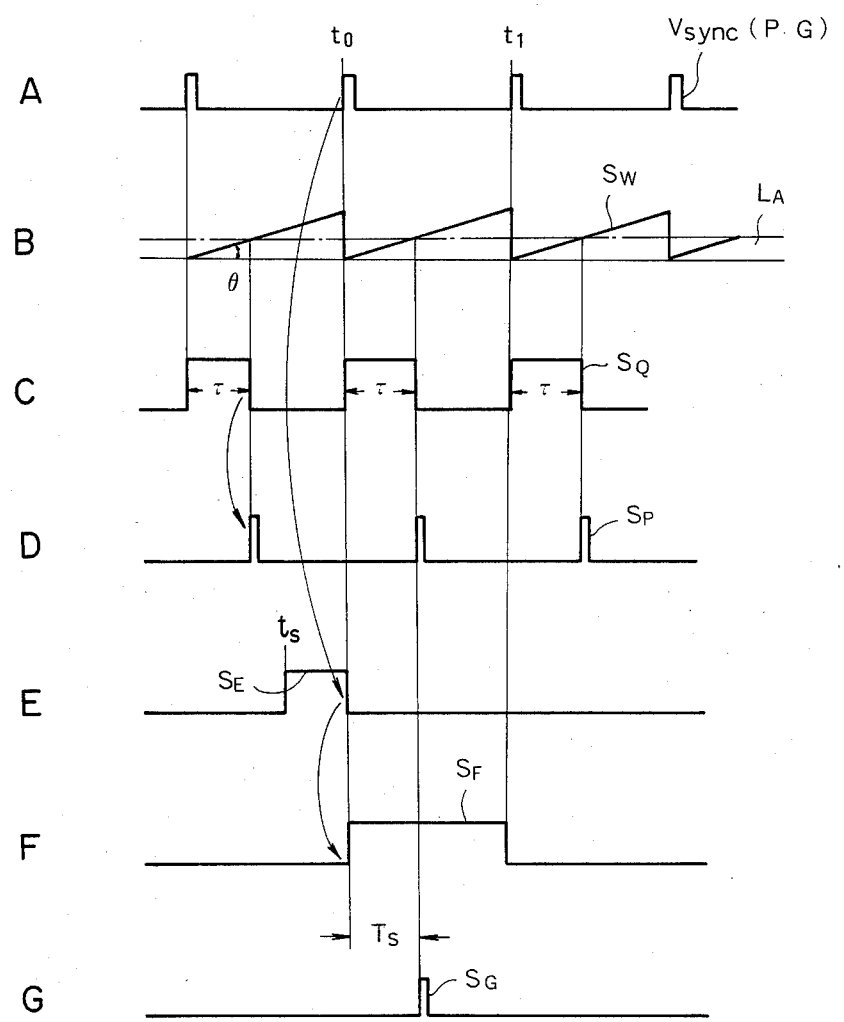
FIGS. 6A through 6G are time charts for explaining the operation of the automatic control system.

The vertical sync signal $V_{sync}$ from the sync generator 51 is supplied to a sawtooth generator 42 which forms a sawtooth signal $S_W$ illustrated in FIG. 6B in response to the input sync signal and supplies the signal $S_W$ to the level comparator 41. The inclination angle $\theta$ of the sawtooth signal $S_W$ is determined according to the setting of the iris diaphragm mechanism 3 illustrated in FIG. 1 in a manner such as to reduce the opening of the optical path of incident light is controlled by the iris diaphragm mechanism 3.

The level comparator 43 compares the level of the sawtooth signal $S_W$ with that of the detected output $V_A$ and produces a rectangular signal $S_Q$ illustrated in FIG. 6C which has a pulse width $\tau$ which corresponds to the exposure period $T_S$. A monostable multivibrator 44 is triggered by the trailing edge of the signal $S_Q$ and produces during each vertical scanning interval 1V, a shutter pulse Sp illustrated in FIG. 6D which passes through the AND gate 45.

The AND gate 45 is controlled by action of the shutter actuating button 5 and receives gate signals formed by a first flip-flop 46 and a second flip-flop circuit 47. The first flip-flop circuit 46 is triggered each time a release switch 41 is closed by the shutter actuating button 5 and produces an affirmative output signal which causes the J input of the second flip-flop circuit 47 to become a logical "1". The second flip-flop circuit 47 receives as its clock input PG pulses synchronized with the vertical sync signal $V_{sync}$ and is triggered by the first PG pulse occurring after setting of the J input to a logical "1" condition. The PG pulse is synchronized with the vertical sync signal $V_{sync}$ by the servo mechanism including a drive motor 13 for the rotary magnetic disc 12 and is thus has the same timing as the signal $V_{sync}$.

The affirmative output signal from the second flip-flop circuit 47 is fed as a clear signal to the first flip-flop circuit 46 as well as being fed as a gate signal to the AND gate circuit 45. Then the first flip-flop circuit 46 produces as shown in FIG. 6E an affirmative output signal $S_E$ of logical "1" state during the period extending from a time $t_s$ at the closing of the release switch 71 to a time $t_0$. Of the first PG pulse.

Meanwhile, the second flip-flop circuit 47 produces as illustrated in FIG. 6F an affirmative output signal $S_F$ of a logical "1" condition during the period extending from time $t_0$ to the time $t_1$ of the next PG pulse.

The AND gate circuit 45 will produce a shutter pulse $S_G$ illustrated in FIG. 6G after the elapse of the exposure period $T_S$ from the time $t_0$ of the first vertical sync signal $V_{sync}$ after the time $t_s$ after the depression of the shutter actuating button 5. The shutter mechanism 4 will be closed by the pulse $S_G$ as illustrated in FIG. 5 which is received from the AND gate circuit 45. The shutter 4 is actuated to oscillate and is in the form of a sector as illustrated in FIG. 5 wherein at certain times it shields the image sensor 9 from light and other times when the shutter is opened as shown in solid line in FIG. 5 it allows the image sensor 9 to receive light energy. Due to the shutter control action, it is possible to obtain video signals of an adequate level in a still image pickup mode. As described above, the video signals representing the still frame image are read out from the solid state image sensor 9 when the shutter mechanism 4 is closed. Although the above described embodiment utilizes an automatic control system of aperture-stop preset type which varies the exposure period according to the aperture stop, the invention may be modified so as to cause automatic gain control for the video signals or it could be utilized as a shutter speed preset type automatic control by utilizing the video signal level or the signal charges obtained during the shutter open period $T_A$.

In the above described embodiment, the signal charges of the first and second fields are transferred from the respective photosensitive regions of the solid state image sensor 9 during the closed period $T_A$ of the shutter mechanism 4. However, the signal charges of two fields may be alternately read out as in an ordinary video camera so that interlaced television signals are produced from the signal charges obtained during the shutter open period $T_A$. An overflow drain may be provided to control the length of the charge storage period $T_C$ in the photosensitive regions of the solid state image sensor 9 and with the optical shutter mechanism 4 being set at a fixed speed the effective exposure period $T_S$ may be varied by controlling the charge storage period $T_C$.

In the case of controlling the charge storage period $T_{C1}$ of the first field photosensitive regions and the charge storage period $T_{C2}$ of the second field photosensitive regions in the solid state image sensor 9 independently of each other, the image pickup control shown in the time chart of FIGS. 7A through 7H may be utilized to realize a solid state image pickup unit equipped with an addition to the above mentioned still image pickup function a moving image pickup function provided in an ordinary video camera.

Figure 7:
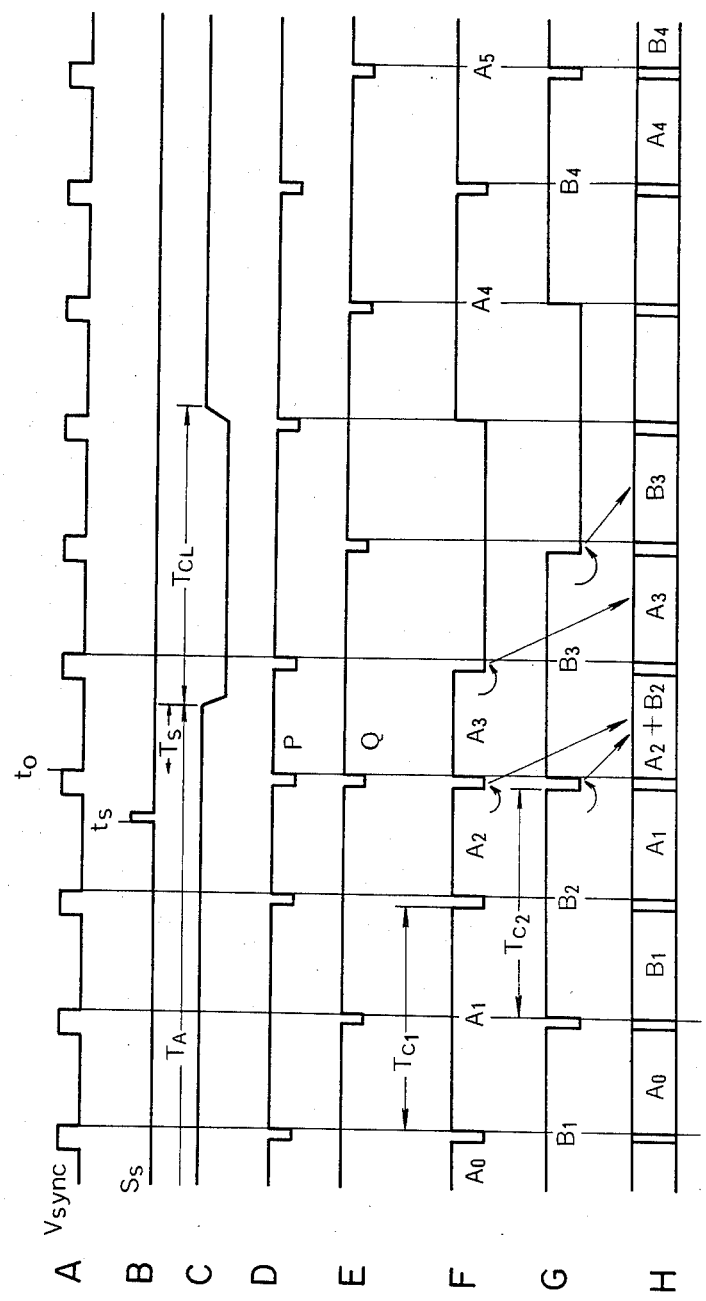
FIGS. 7A through 7H are time charts for explaining the operation of another embodiment of the invention.

FIG. 7A illustrates a vertical sync signal $V_{sync}$ FIG. 7B illustrates a shutter actuating signal $S_S$.

FIG. 7C illustrates the operating state of the optical shutter mechanism 4. FIG. 7D illustrates the operating state of the transfer gate which is opened for transferring signal charges from the first field photosensitive regions of the solid state image sensor 9 to the vertical shift register 93. FIG. 7E shows the operating state of the transfer gate for transferring the second field signal charges to the vertical shift register 93. FIG. 7F shows the control state during the charge storage period $T_{C1}$ of the first frame photosensitive regions with the actual exposure time extending over two fields although the charges are read out as one field signals eventually. FIG. 7G shows the control state during the charge storage period $T_{C2}$ of the second frame photosensitive regions and FIG. 7H shows a pattern of the video signals read out from the solid state image sensor 9.

During the period $T_A$ prior to generation of the shutter actuating signal $S_S$, the first frame photosensitive regions are activated to store charges therein alternately at a cycle of a frame. The first frame signal charges A obtained during the first charge storage period $T_{C1}$ and the second frame signal charges B obtained during the second charge storage period $T_{C2}$ are alternately read out at a cycle of a frame so that synthetically the signal reading is executed at a cycle of field so as to provide interlaced video signals. Also, the photosensitive regions of the first and second fields may be simultaneously placed in a charge storage state at the time $t_0$ of the first vertical sync signal after the generation of the shutter actuating signal $S_S$ thus providing signal charges $A_C$ and $B_C$ for a frame image without any space deviation of the image. By reading out the signal charges $A_3$ and $B_3$ of the individual fields sequentially during the shutter closed period $T_{CL}$ it is possible while shooting a moving object to obtain video signals of a still frame image without flicker as has been previously mentioned. FIG. 7F through 7H have arrows which indicate the flow of the storage charges. Thus, the storage charges A2 and B2 are simultaneously read out according to the vertical shift pulses P and Q illustrated in FIGS. 7D and 7E and then the combined charges $A_2$ plus $B_2$ are transferred as shown in FIG. 7H. The charges $A_2$ and $B_2$ thus moved are swept away to the charge absorbing section 95 during the charge sweep period (not shown).

The charges $A_3$ and $B_3$ obtained during exposure period $T_S$ extending from the time $t_0$ of the vertical sync signal to the closing of the shutter mechanism are sequentially shifted as indicated by the arrows and then are read out during the period of one field.

As is evident from the description given above with the mentioned embodiment, the effective exposure period in a still image pickup mode is controlled by closing during the charge storage period of the solid state image sensor, the normally opened shutter which is provided to open or close the optical path of incident irridated upon the solid state image sensor. By reading out the signal charges from the image sensor with the shutter closed, it becomes possible to pickup a still image which has a remarkably high quality without deterioration that would otherwise result from smearing. In reading out the signal charges from the image sensor, the undesired phenomena of blooming is prevented by sweeping away any unrequired preceeding charges from the vertical shift register immediately before tranferring the signal charges from the photosensitive regions to the vertical shift register. Also, as the signal charges obtained by simultaneously placing the one frame photosensitive region of the solid state image sensor in a exposed state are read out sequentially by individual fields, video signals can produce a still frame image which does not have flicker. Also, in a still image pickup operation which is performed with the normally-opened shutter closed, aperture-stop preset type or shutter-speed preset type automatic control is obtainable by utilizing as control signals the signal charges obtained from the solid state image sensor prior to the effective exposure period thus realizing automatic setting of the various functions which are suitable for practical pickup conditions.

Thus, in a solid state image pickup unit for producing a still image with a solid state image sensor having photosensitive regions for first field picture elements and other photosensitive regions of second field picture elements, the present invention is equipped with an optical shutter for opening or closing the optical path of the incident light so as to control the exposure time and the first and second field images are simultaneously picked up by the photosensitive regions with the shutter open and the first field and second field signal charges are sequentially read out at different times with the shutter closed so that a still frame image can be picked up with a high vertical resolution without flicker.

Also, in a solid state image pickup unit for producing an image with a solid state image sensor while controlling the exposure time by an optical shutter provided to open or close the optical path of the incident light another advantage of the present invention is that immediately before transferring charges obtained in each of the photosensitive region of the image sensor and reading out the signal charges before transferring to a vertical shift register, the shutter is opened so that any unrequired preceeding charges remaining in the vertical shift register are swept away and after the shutter is closed the signal charges are read out through the vertical shift register. Therefore, the image sensor can be simply formed with a high quality image which would otherwise be subjected to smearing or blooming and a satisfactory image quality is obtained in a still image pickup mode.

Also, in the solid state image pickup unit comprising a solid state image sensor, having a function to control a charge storage period and an optical shutter capable of opening and closing the optical path of the incident light irridated to the image sensor, the shutter being normally kept open is closed during the charge storage period of the image sensor so that the effective exposure time is controlled and the signal charges are read out from the image sensor with the shutter closed. Such a unit has the further advantage in that the charge storage period of the solid state image sensoris preset to have a fixed time and an aperture stop or a shutter speed is controlled automatically in response to the signal charges obtained during the charge storage period prior to the effective exposure time so that the image pickup signals of a satisfactory quality can be produced at a proper signal level with certainty from the image sensor.

Although the invention has been described with respect to preferred embodiments, it is not to be so limited as changes and modifications can be made which are within the full intended scope of the invention as defined by the appended claims.

We claim as our invention:

1. In a solid state image pickup unit for producing a still image with a solid state image sensor having interspersed photosensitive regions for first-field picture elements and other photosensitive regions for second-field picture elements, the improvement comprising an optical shutter for opening or closing the optical path of incident light so as to control an exposure time of said first and second field picture elements, wherein said first-field and second-field images are picked up simultaneously by said photosensitive regions with said shutter opened, and the charges from a first-field and a second-field signal are read out sequentially with said shutter closed.

2. In a solid state image pickup unit for producing an image with a solid state image sensor having first and second field photosensitive picture elements while controlling an exposure time by an optical shutter provided to open or close the optical path of incident light, the improvement characterized in that, immediately before transferring to a vertical shift register signal charges obtained in each of the photosensitive elements of said image sensor and reading out said signal charges, said shutter is opened so that any preceding unrequired charges remaining in said vertical shift register are swept away, and after said shutter is closed, the signal charges are read out via said vertical shift register.

3. A solid state image pickup unit comprising a solid state image sensor with first and second photosensitive field elements with means to control a charge storage period and an optical shutter capable of opening and closing the optical path of incident light irradiated to said image sensor, wherein said shutter is kept open and is closed during a portion of a charge storage period of said image sensor so that the effective exposure time is controlled, and the signal charges from said fist and second field elements are simultaneously exposed and are read out from said image sensor with the shutter closed, said image pickup unit characterized in that the charge storage period of said solid state image sensor is preset to have a fixed length, and an aperture stop or a shutter speed is controlled automatically in response to the signal charges obtained during the charge storage period prior to said effective exposure time.

4. A solid state image pickup according to claim 3, wherein the shutter speed is controlled and a shutter driving means is connected to said shutter, a peak detector circuit connected to said image pickup unit, a comparator circuit receiving the output of said peak detector circuit, a reference level circui supplying an input to said comparator circuit and the output of said comparator circuit connected to said driving means.

5. A solid state image pickup according to claim 4, wherein a multivibrator receives the output of said comparator, an AND gate receives the output of said multivibrator, and a first flip-flop circuit controlled by a shutter actuate button supplies an input to said AND gate.

6. A solid state image pickup according to claim 5, including a second flip-flop circuit connected between said first flip-flop circuit and said AND gate.

7. A solid state image pickup according to claim 4, wherein said reference level circuit comprises a sync generator which produces vertical sync pulses and a sawtooth generator which receives the vertical sync pulses from said sync generator and supplies an input to said comparator circuit.

8. A solid state image pickup according to claim 7, including a driver circuit receiving horizontal and vertical sync pulses from said sync generator and supplying switching signals to said solid state image pickup.

9. A solid state image sensor comprising first and second photosensitive first and second field elements alternately arranged in a matrix, a plurality of bilateral first shift registers mounted parallel to each other to shift charges from said first and second field elements, a plurality of transfer gates between said first and second field elements and said first plurality of shift registers to shift charges thereto, an output shift register connected to first ends of said first plurality of shift registers, a charge absorbing region connected to second ends of said first plurality of shift registers, an optical shutter for opening and closing the optical path of light to control the exposure on said first and second photosensitive elements, means for controlling said shutter, a shutter actuator connected to said means for controlling said shutter such that said first and second photosensitive elements are simultaneously exposed with the shutter open, and means for controlling said transfer gates, said plurality of bilateral shift registers and said output shift register so that charges from said first and second field photosensitive elements are sequentially transferred to said bilateral shift registers and are sequentially read out when said shutter is closed.

10. A solid state image sensor according to claim 9 wherein before transferring the charges from said first and second field photosensitive elements to said plurality of first shift registers, any residual charges in said first plurality of shift registers are transferred to said charge absorbing region to prevent blooming.

11. A solid state image sensor according to claim 10 wherein the time said shutter is open is variable.

12. A solid state image sensor according to claim 11 wherein the shutter open time is calculated by the charges obtained prior to the effective exposure time.

13. A solid state image sensor according to claim 9 including a light controlling iris means in the light path to said first and second photosensitive elements and means for controlling said iris means to change the exposure.

14. A solid state image sensor according to claim 13 including automatic means for controlling said iris means.

* * * * *